May 11, 1954            J. SINKO            2,678,127
ASH RECEPTACLE
Filed April 20, 1950
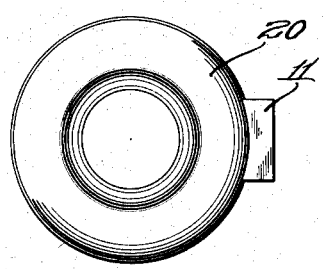
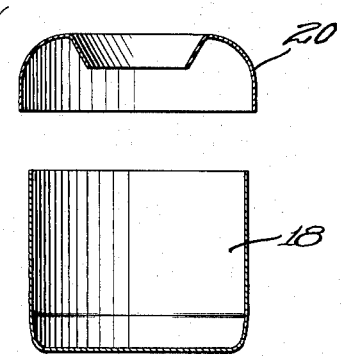
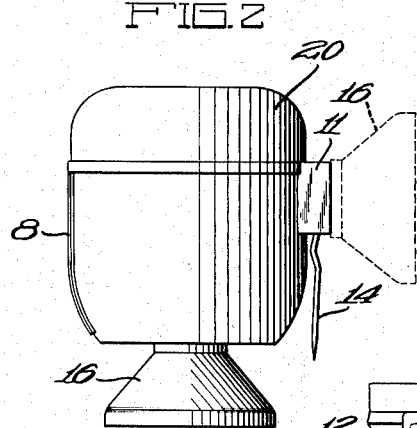
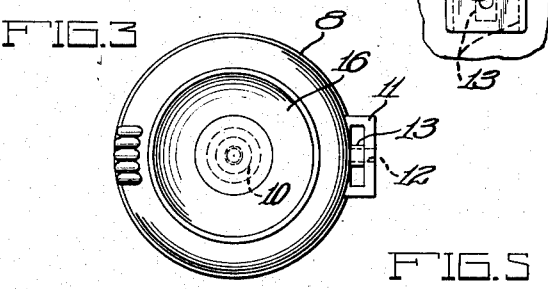
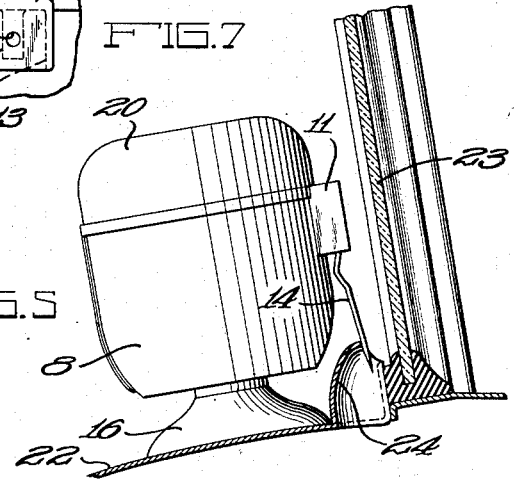
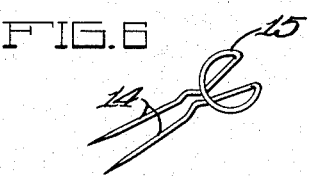
Inventor:— John Sinko
By:— Schroeder, Merriam, Hofgren & Brady
Attorneys

UNITED STATES PATENT OFFICE 2,678,127

ASH RECEPTACLE

John Sinko, Chicago, Ill.

Application April 20, 1950, Serial No. 157,080

1 Claim. (Cl. 206—19.5)

This invention relates to an ash receptacle, and more particularly to an accessory unit which may be attached to various parts of an automobile.

The primary object of the invention is to provide an improved ash receptacle with two different attaching means which may be used separately or together for securing the device to various parts of a car or other vehicle. One of the attaching devices is a suction cup which may be secured to the bottom or side of the unit and pressed against the instrument board or wind shield of a car. The other attaching device is a double leg pin which fits into a projection on the side of the receptacle and may be used to fasten the device to the upholstery of a car, or can be used with the suction cup to hold the receptacle against vibration.

The invention is illustrated in a preferred embodiment in the accompanying drawings in which—

Figure 1 is a top plan view of the device; Fig. 2, a side elevational view illustrating how the suction cup may be attached to either the side or the bottom of the receptacle; Fig. 3, a bottom plan view; Fig. 4, an exploded sectional view of the device; Fig. 5, an elevational view showing how the device may be attached to an automobile (indicated in fragmentary section); Fig. 6, a plan view of the double pin fastener; and Fig. 7, a fragmentary side elevational view of the projections for holding the pin and suction cup.

The main body of the ash receptacle is a cup-shaped housing 8, preferably of molded plastic. Its bottom portion preferably is dished upwardly, as indicated at 9, to provide room for a hidden boss 10. The housing is also provided with a laterally extending boss 11, which has a tapped hole 12 and a hidden U-shaped opening 13, to receive a double-legged pin 14.

The pin fastener 14 has a pair of legs resiliently connected at their upper ends by means of a horse-shoe shaped head portion 15 adapted to be pressed into the opening 13 and held there frictionally.

A rubber suction cup 16 has a threaded stud 17 which may be screwed into the boss 10 or the hole 12 in the projection 11.

A metal cup 18 is shaped to fit into the housing 8, and is retained in the housing by means of an apertured cover 20 which fits over the upper marginal portion of the housing and abuts against a shoulder 21.

As shown in Fig. 5, the unit may be mounted on an instrument board 22 by means of the suction cup 16, with the pin fastener 14 extending into the defroster conduit 24 to hold the receptacle against vibrating on its resilient base. Of course, the cup could be pressed against the wind shield 23, or the cup could be left off and the device attached to the upholstery of the car by means of the fastener 14.

The foregoing detailed description is given for clearness of understanding only, and no unnecessary limitations should be understood therefrom, for some modifications will be obvious to those skilled in the art.

I claim:

An ash receptacle for a vehicle comprising: a cup-shaped housing of plastic material provided on its side with an integral downwardly open hollow projection, said projection extending outwardly from the housing and having a pair of downwardly extending adjacent wells for frictionally receiving the head end of a double pin, a double pin having a pair of legs and a head portion joining the upper end of the legs by a horseshoe-shaped portion extending back over the legs, said head portion of each leg being frictionally secured in one of said wells with the legs extending downwardly beside the housing; said housing being upwardly open to receive a metal cup insert; and an apertured cover for confining said insert within the housing.

References Cited in the file of this patent

UNITED STATES PATENTS

| Number | Name | Date |
|---|---|---|
| 649,800 | Bollard | May 15, 1900 |
| 1,404,755 | Gay | Jan. 31, 1922 |
| 1,739,801 | Pitts | Dec. 17, 1929 |
| 1,912,682 | Belt | June 6, 1933 |
| 1,993,938 | McDonald | Mar. 12, 1935 |
| 2,160,348 | Wallace | May 30, 1939 |
| 2,509,150 | Kassovic | May 23, 1950 |